(12) United States Patent
Scoggins

(10) Patent No.: US 9,151,250 B2
(45) Date of Patent: Oct. 6, 2015

(54) FLUID COOLING SYSTEM

(76) Inventor: Donald B. Scoggins, Clifton, CO (US)

(\*) Notice: Subject to any disclaimer, the term of this patent is extended or adjusted under 35 U.S.C. 154(b) by 574 days.

(21) Appl. No.: 13/440,937

(22) Filed: Apr. 5, 2012

(65) Prior Publication Data

US 2013/0263832 A1  Oct. 10, 2013

(51) Int. Cl.
*F28F 13/00* (2006.01)
*F02M 25/07* (2006.01)

(52) U.S. Cl.
CPC ............ *F02M 25/0737* (2013.01); *Y02T 10/121* (2013.01)

(58) Field of Classification Search
CPC ......... F02M 25/0731; F01P 5/08; F01P 11/10
USPC ............. 123/540–542, 198 AB, 41.01–41.85, 123/563; 165/146, 147, 151
See application file for complete search history.

(56) References Cited

U.S. PATENT DOCUMENTS

| | | | | |
|---|---|---|---|---|
| 2,053,037 A | * | 9/1936 | Lintern | 165/126 |
| 3,875,745 A | * | 4/1975 | Franklin | 60/319 |
| 3,885,936 A | * | 5/1975 | Limebeer | 62/304 |
| 4,067,384 A | * | 1/1978 | Miyakawa | 165/151 |
| 5,906,236 A | * | 5/1999 | Adams et al. | 165/46 |
| 6,848,433 B2 | | 2/2005 | Scoggins | |
| 7,322,192 B2 | | 1/2008 | Sheidler et al. | |
| 7,322,193 B2 | | 1/2008 | Bering et al. | |
| 2003/0205219 A1 | * | 11/2003 | Scoggins | 123/541 |
| 2010/0154758 A1 | * | 6/2010 | Schneider et al. | 123/568.12 |

\* cited by examiner

*Primary Examiner* — Stephen K Cronin
*Assistant Examiner* — Joseph Dallo
(74) *Attorney, Agent, or Firm* — Aileen Law; Oppedahl Patent Law Firm LLC

(57) ABSTRACT

Disclosed is a simplified system of cooling an exhaust from an internal combustion engine by drawing ambient air through a heat exchanger which comprises a venturi in the exhaust circuit to drive said cooling medium therethrough. The disclosed device could also be used in the cooling of other media.

18 Claims, 5 Drawing Sheets

FLUID COOLING SYSTEM

FIELD OF ART

The disclosed device relates generally to a fluid cooling system which draws ambient air through a heat exchanger to provide a lower limiting ambient temperature, and more specifically to the heat exchanger having a venturi configured in an exhaust line to draw the cooling medium through the fluid cooling system.

BACKGROUND

Emission standards are requirements that set specific limits to the amount of pollutants that can be released into the environment. Many emission standards focus on regulating pollutants released by automobiles and other powered vehicles but they can also regulate emissions from industry, power plants, and small equipment such as lawn mowers and diesel generators. Standards generally regulate the emissions of nitrogen oxides ($NO_x$), sulfur oxides ($SO_x$), particulate matter (PM), carbon monoxide (CO), volatile organic compounds (VOCs) and other pollutants. According to the Environmental Protection Agency, nonroad diesel engines contribute greatly to air pollution in many of the nation's cities and towns.

In recent years, standards have been established to reduce emissions from nonroad diesel engines which traditionally met relatively modest emission requirements. The first federal standards (Tier 1) for new nonroad (or off-road) diesel engines were to be phased in from 1996 to 2000. Increasingly more stringent Tier 2 and Tier 3 standards for all equipment had phase-in schedules from 2000 to 2008. Tier 4 standards are to be phased in over the period of 2008-2015 and require that emissions of PM and $NO_x$ be further reduced by about 90%.

The new standards apply to diesel engines used in industries such as construction, agricultural, and mining and are designed to reduce emissions from nearly every type of diesel vehicle and equipment. The standards are phased in over several years to provide adequate lead time to engine and equipment manufacturers. It is estimated that over 650,000 pieces of nonroad diesel equipment sold in the United States each year will be covered by the new standards. Currently about six million pieces of nonroad diesel equipment are in use in the United States.

The new emission standards for PM and $NO_x$ which can be found in EPA Publication 420-F-04-032 (May 2004) are tabulated below.

| | Final Emission Standards (g/hp-hr) | | |
|---|---|---|---|
| Rated Power | First Year Standards Apply | PM | $NO_x$ |
| hp < 25 | 2008 | 0.30 | — |
| 25 ≤ hp < 75 | 2013 | 0.02 | 3.5 (includes nonmethane hydrocarbons) |
| 75 ≤ hp < 175 | 2012-2013 | 0.01 | 0.30 |
| 175 ≤ hp < 750 | 2011-2013 | 0.01 | 0.30 |
| hp ≥ 750 | 2011-2014 | 0.075 | 2.6 |
| | | | 0.50 gensets over 1200 hp |
| | 2015 | 0.02 gensets; 0.03 all engines | 0.50 all gensets |

Specifically, Tier 4 emission standard for engines, to be phased-in from 2008-2015, introduce substantial reductions of $NO_x$ (for engines above 56 kW) and PM (above 19 kW), as well as more stringent HC limits. CO emission limits remain unchanged from the Tier 2-3 stage. In engines of 56-560 kW rated power, the $NO_x$ and HC standards are phased-in over a few year period. The initial standards (PM compliance) are sometimes referred to as the "interim Tier 4", "Tier 4i", "transitional Tier 4" or "Tier 4 A", while the final standards ($NO_x$/HC compliance) are sometimes referred to as "Tier 4 B". As an alternative to introducing the required percentage of Tier 4 compliant engines, manufacturers may certify all their engines to an alternative $NO_x$ limit in each model year during the phase-in period. These alternative $NO_x$ standards are:

Engines 56-130 kW:
  Option 1: $NO_x$=2.3 g/kWh=1.7 g/bhp-hr (Tier 2 credits used to comply, MY 2012-2013)
  Option 2: $NO_x$=3.4 g/kWh=2.5 g/bhp-hr (no Tier 2 credits claimed, MY 2012-2014)
Engines 130-560 kW: $NO_x$=2.0 g/kWh=1.5 g/bhp-hr (MY 2011-2013)

The disclosed device and method enables an operator to move a cooling medium across the cooling tubes of a heat exchanger to promote a cooling effect on diesel engines which do not rely on ram-air for cooling purposes like a typical motor vehicle capable of being used on roads and highways. The disclosed device and method utilize a venturi in the exhaust line to draw the cooling medium through the system.

Although prior art systems exist, the present device and method eliminates or reduces the requirement for multiple conduits and connections thereby providing for a cleaner, less complicated packaged installation. The design of the system described herein results in a more reliable system and potential cost savings in the manufacture thereof. Advantageously, emissions are reduced and fuel usage is reduced.

U.S. Pat. No. 6,848,433 utilizes a venturi in the cooling medium inlet. A fluid cooling system comprises a heat exchanger having a pressure differential between an inlet area and a cooling area. A venturi is configured between the areas to enhance flow of a cooling medium from the exchanger output which is connected to an exhaust pipe.

U.S. Pat. No. 7,322,192 discloses an internal combustion engine having an exhaust gas recirculation (EGR) system. The system includes an air-to-gas EGR cooler, an air inlet line communicating cooling inlet air to the EGR cooler, an EGR supply line communicating exhaust to the EGR cooler, a venturi in the exhaust circuit, and an air outlet line communicating heated air from the EGR cooler to the venturi. Flow of exhaust through the venturi draws cooling air through the EGR cooler. The EGR system also includes a turbocharger having an exhaust turbine and an inlet air compressor. A compressor outlet circuit communicates air from the compressor to an engine air intake. A valve is located in the compressor outlet circuit. An EGR venturi in the compressor outlet circuit is connected in parallel with the valve. A cooled EGR line communicates cooled exhaust from the EGR cooler to a suction port of the EGR venturi.

U.S. Pat. No. 7,322,193 discloses an exhaust gas recirculation (EGR) system for an internal combustion engine having a combustion air intake circuit, an exhaust manifold, and an exhaust circuit for communicating engine exhaust to the environment. The EGR system includes an air-to-gas EGR cooler, an air supply conduit for supplying inlet air to the EGR cooler, an EGR supply conduit for communicating exhaust from the exhaust circuit to the EGR cooler, and an EGR outlet conduit communicating cooled EGR from the EGR cooler to the intake circuit. The EGR system also includes a venturi unit in the exhaust circuit, and an air outlet conduit communicating heated air from the EGR cooler to the venturi unit. Flow of exhaust through the venturi creates a pressure which draws cooling air through the EGR cooler. A valve controls flow through the outlet conduit as a function of a sensed temperature in the intake circuit.

The prior art referenced above feature an enclosed heat exchanger, a venturi unit in the exhaust circuit, a multiplicity of hoses and connectors in communication with the heat exchanger and associated equipment. Specifically, the prior art devices feature at least four points of connection with the heat exchanger. These are 1) the cooling medium inlet, 2) the cooling medium outlet, 3) the inlet for the medium to be cooled and 4) the outlet for the medium to be cooled. None of the prior art references disclose a system having a reduced number or conduits and connections thereby providing for a less complicated, yet effective means of cooling the medium by means of drawing ambient air through the system's heat exchanger.

SUMMARY OF THE DISCLOSURE

The disclosed device draws ambient air through a heat exchanger configured in an exhaust line for the cooling of EGR. The disclosed system comprises a venturi in the exhaust line to draw the cooling medium therethrough. The disclosed system enables a cooling medium to move across the cooling tubes of a heat exchanger to promote a cooling effect on diesel engines which do not use ram-air for cooling purposes. The disclosed system comprises an integrated heat exchanger design having a reduced number or conduits and connections which provides for a less complicated, yet effective means of cooling the medium by means of drawing ambient air through the system's heat exchanger.

An aspect of the disclosed system is to provide a fluid cooling apparatus comprising a heat exchanger having a pressure differential between an inlet area and a cooling area and a venturi configured between the areas to promote flow of a cooling medium through the heat exchanger.

Another aspect of the disclosed system is to provide a heat exchanger apparatus that draws a cooling medium therein by means of an inlet capable of inducing a pressure differential.

Another aspect of the disclosed device is to provide a heat exchanger apparatus that enables a cooling medium to pass through the system without the use of ancillary equipment such as fans to move cooling air into the system.

Another aspect of the disclosed system is to provide an apparatus having no moving parts to move flow across the system's cooling fins.

Another aspect of the disclosed system is to provide a heat exchanger apparatus that is mounted in-line with an exhaust line, the apparatus being disposed circumferentially about and spaced away from an outer diameter of an exhaust pipe.

Another aspect of the disclosed system is to provide a cylindrical or conical heat exchanger assembly wherein hot exhaust may enter and be cooled.

Another aspect of the disclosed system is its adaptability to currently available nonroad diesel engines.

Another aspect of the disclosed system is to promote a cooling effect on diesel engines which do not use ram-air for cooling purposes.

Another aspect of the disclosed system is its ability to be used on cooling systems and package heat exchangers that are operating at a maximum efficiency without increasing heat loads on the systems.

An aspect of the disclosed system is to provide a high performance cooling apparatus that addresses situations where there is a large volume of medium to be cooled inside the heat exchanger cooling fins.

Another aspect of the disclosed system is to provide an apparatus which eliminates or reduces the multiple conduits and connections used in conventional systems thereby providing for a simplified installation package.

Another aspect of the disclosed system is to provide a more reliable integrated heat exchanger design by reducing or eliminating the number of conventional conduits and connections used.

Another aspect of the disclosed system is to reduce manufacturing costs by reducing the number of conduits and connections as compared to that used in conventional cooling systems.

Yet another aspect of the disclosed system is to provide for a reduction in air emissions.

Another aspect of the disclosed system is to provide for a reduction in fuel usage.

These and other advantages of the disclosed device will appear from the following description and/or appended claims, reference being made to the accompanying drawings that form a part of this specification wherein like reference characters designate corresponding parts in the several views.

Before explaining the disclosed embodiments of the disclosed device in detail, it is to be understood that the device is not limited in its application to the details of the particular arrangements shown, since the device is capable of other embodiments. Also, the terminology used herein is for the purpose of description and not of limitation.

DESCRIPTION OF THE DISCLOSED EMBODIMENTS

The following description is provided to enable any person skilled in the art to make and use the disclosed apparatus. Various modifications, however, will remain readily apparent to those skilled in the art, since the generic principles of the present apparatus have been defined herein specifically to provide for a simplified system of cooling a medium by drawing ambient air through a heat exchanger which utilizes a venturi in an exhaust circuit to drive the cooling medium therethrough.

Figure 1:
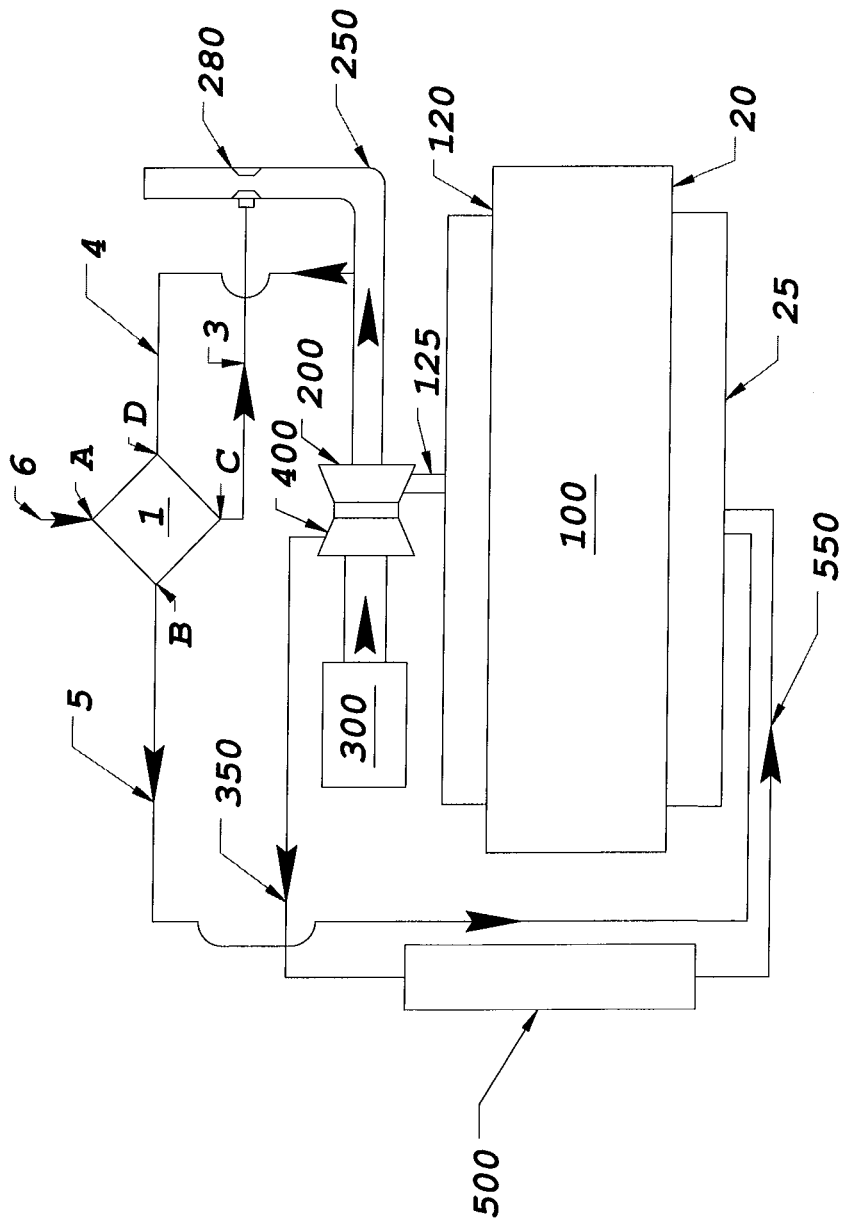
FIG. 1 is a schematic of the prior art where ambient air is drawn into a housed heat exchanged and communicated to a venturi in an exhaust line via a conduit.

FIG. 1 is a schematic depicting a prior art exhaust gas recirculation (EGR) system comprising engine 100 which has an inlet side 20 and an exhaust side 120. An exhaust line 125 conveys engine exhaust from engine 100 to turbine 200. Exhaust line 250 conveys exhaust from turbine 200 to atmosphere. As exhaust gas flows through exhaust line 250, venturi 280 creates a suction or negative pressure which draws cooling air through housed heat exchanger 1 and conduit 3.

Heat exchanger 1 comprises four ports: a cooling medium inlet, A, a cooling medium outlet, C, an inlet for the medium to be cooled, D and an outlet for the medium to be cooled, B. Thus, this figure illustrates the four points of connection with the heat exchanger mentioned above. Conduit 4 communicates a portion of the hot exhaust gas from exhaust line 250 downstream of turbine 200 (recirculated exhaust gas) to inlet D of heat exchanger 1. Ambient air 6 is drawn into inlet A of housed heat exchanger 1. Conduit 5 communicates cooled EGR from outlet B to engine intake manifold 25. Conduit 3 communicates heated air from outlet C to venturi 280 which is housed in exhaust line 250. Venturi 280 is produced by reducing the inner diameter of exhaust line 250.

Air filter 300 receives air from the environment which is conveyed to compressor 400. Air intake line 350 conveys compressed air to an inlet of charge air cooler 500. Intake line 550 conveys cooled charge air from charge air cooler 500 to engine intake manifold 25.

Figure 2:
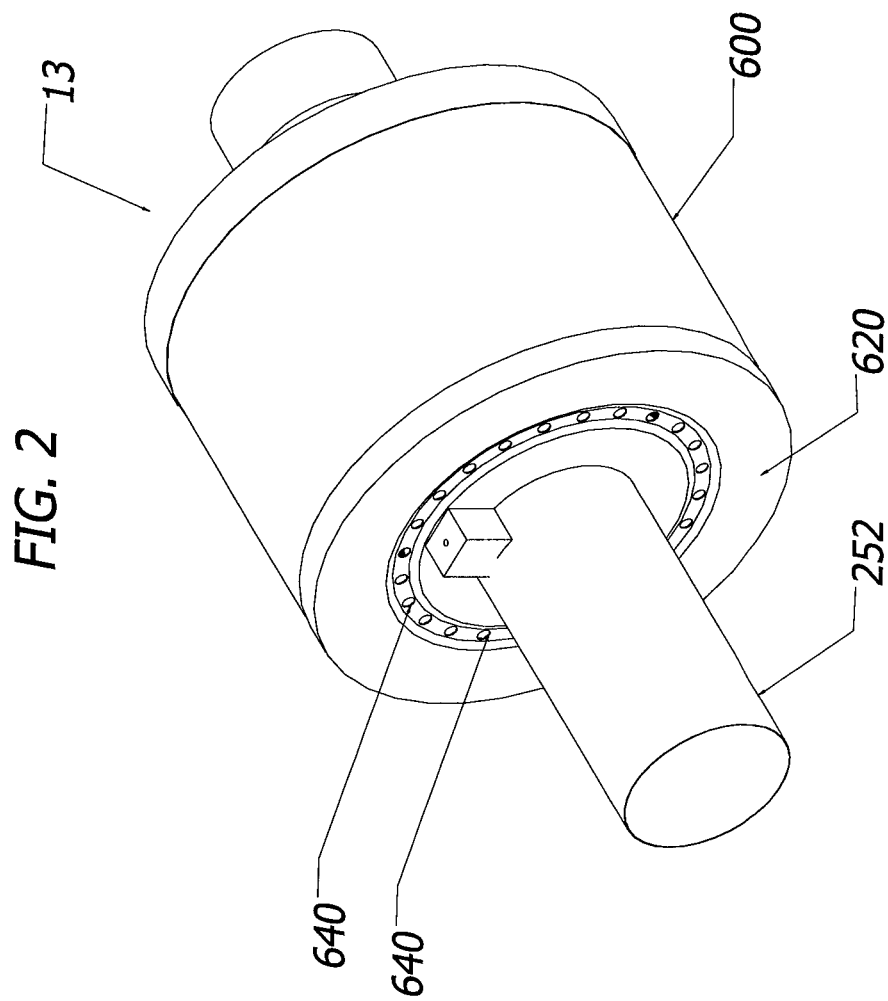
FIG. 2 depicts one embodiment of the disclosed apparatus.

FIG. 2 depicts one embodiment of the disclosed device. It is contemplated that the device disclosed herein comprises no moving parts or ancillary equipment such as fans to move cooling air into the system. Generally, a 1200 square inch fin tube area requires approximately 2500 cubic feet per minute (CFM) air flow at full power. This system disclosed herein is capable of moving this type of flow across the system's cooling fins for heat transfer by the nature of its design. The device can be used for new installations as well as retrofits of system and package heat exchangers for gases and/or liquids without increasing heat loads on cooling systems that are operating at maximum efficiency.

Heat exchanger assembly 13 comprises a cylindrical heat exchanger housing 600 having an orifice therethrough which is configured to receive a length of an exhaust pipe 252. In operation, heat exchanger assembly 13 is disposed circumferentially about and spaced away from an outer diameter of exhaust pipe 252. Atmospheric inlet plate (or base plate) 620 comprises holes 640 for conveying a cooling medium (ambient air) 12 therethrough (not shown). The series of holes 640 restricts air flow which, in turn, creates a pressure differential and effectively lowers limiting ambient temperature.

Figure 3:
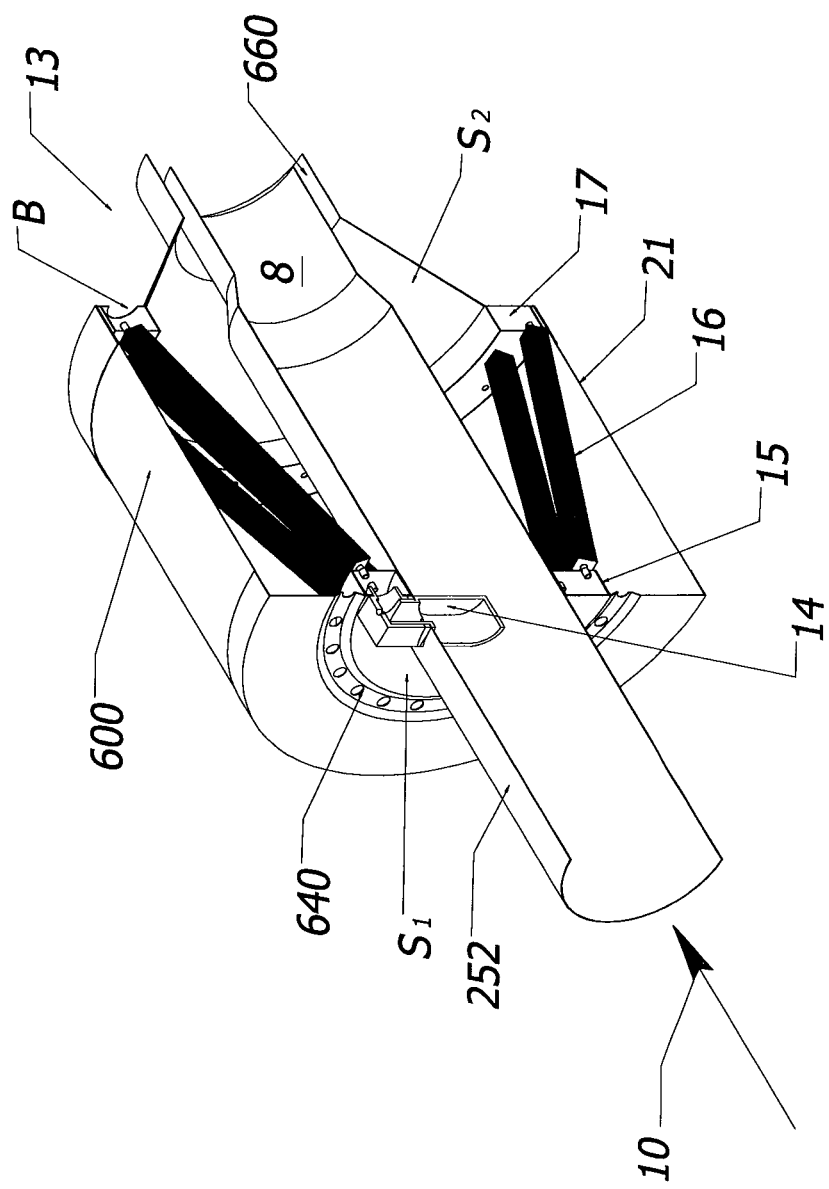
FIG. 3 is a partial sectional view of a conical embodiment of the disclosed apparatus.

FIG. 3 is a partial cross-sectional view of the embodiment shown in FIG. 2. As stated above, heat exchanger assembly 13 comprises a heat exchanger housing 600 disposed circumferentially about an outer diameter of exhaust conduit 252. An inner diameter of housing 600 is separated from an outer diameter of exhaust conduit 252 by space $S_1$. In one embodiment, the major diameter of housing 600 is about double or greater than about double the diameter of the original exhaust pipe 252.

Figure 4:
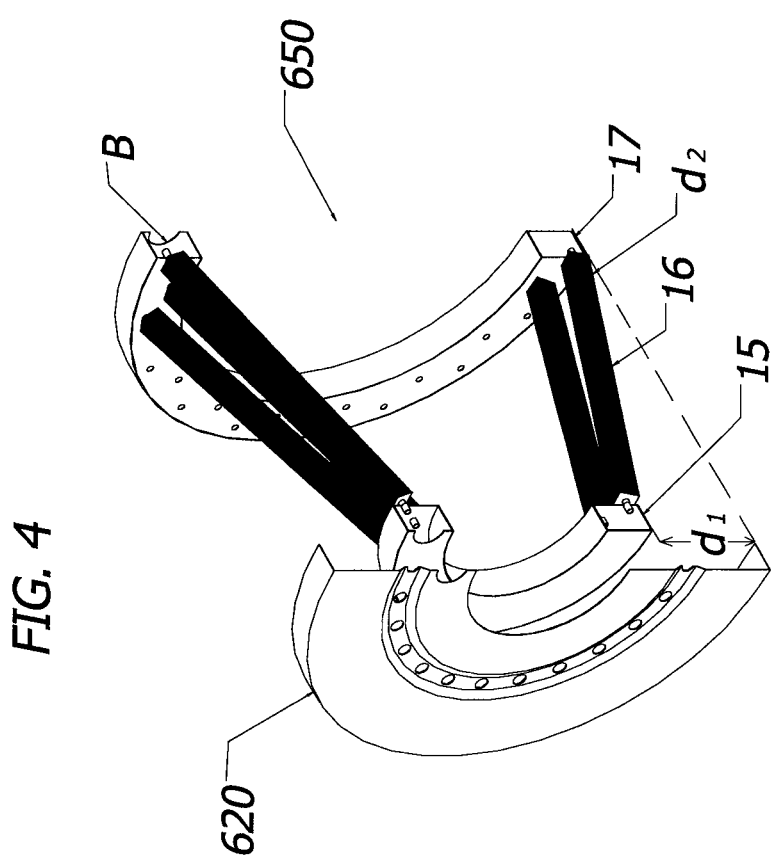
FIG. 4 depicts an internal assembly of the apparatus shown in FIG. 3.

Housing 600 serves to house a cylindrical or conical heat exchanger assembly 650 wherein hot exhaust may enter and be cooled (see also FIG. 4). If the outer surface of housing 600 remains substantially cylindrical, heat exchanger assembly 650 tapers such that it would be conically shaped, or $d_1 > d_2$ where $d_1$ is the distance between the inner surface of housing 600 and the outer surface of heat exchanger tank 15 and $d_2$ is the distance between the inner surface of housing 600 and the outer surface of one or more heat exchanger finned tubes 16 It is also contemplated that a cylindrical tank embodiment could be used where $d_1 = d_2$.

Exhaust line 252 comprises an exhaust gas recirculation inlet 14 which communicates with tank 15 of heat exchanger 13 thereby enabling exhaust gases to be conveyed from exhaust line 252 to tank 15. A plurality of heat exchanger finned tubes 16 communicate cooled EGR to outlet tank 17 whereby the cooled EGR gases exit by means of outlet B (see also FIGS. 4 and 5) to be conveyed to engine 102. As shown, outlet tank 17 takes the form of a square ring having an inner diameter and an outer diameter. The outer diameter of tank 17 is adjacent to the inner diameter of housing 600. The inner diameter of tank 17 is spaced away from exhaust pipe 252 to minimize radiant heat effects from the exhaust on the cooled EGR. Heat exchanger tank 15 can also take the form of a square ring having an inner diameter and an outer diameter.

For clarity purposes, heat exchanger tank 15 is shown offset from base plate 620 in FIG. 4. Typically, tank 15 abuts an inner surface of base plate 620. Outlet tank 17 abuts an inner surface of housing 600 at an opposite end thereof. One having ordinary skill in the art of heat exchanger design will recognize that tanks 15, 17 may comprise other suitable shapes and configurations and still fall within the scope of this disclosure.

In a conical embodiment where $d_1 > d_2$ the configuration of tanks 15, 17 and finned tubes 16 helps to keep the outlet end thermally separate from the inlet end and thus reduces radiant heat effects at the cooled end of heat exchanger 13. The conical shape also helps to ensure that the cooling medium will be drawn into holes 640 so it may enter space $S_2$ which is adjacent to tank 15, finned tubes 16 and outlet tank 17. The cooling medium then diffuses into exhaust stream 10 via gap 660 disposed adjacent to concentric venturi 8.

It is contemplated that holes 640 serve as an inlet venturi for ambient air. If desired, a section of exhaust conduit 252 can be configured to have an increased diameter from its inlet end (or a reverse taper). Thus, the disclosed configuration could provide for an inlet capable of inducing a pressure differential for exhaust gas if desired.

FIG. 4 illustrates the positioning of a few of the plurality of tubes 16 that can be used in the disclosed device. Although tubes 16 are shown having a square and serrated construction, it is contemplated that round and/or hollow tubes could also be used. In one embodiment, an array of thirty-six (36) 21" finned tubes were configured in close proximity to each other in conjunction with a tank 15 having a major diameter of about 16" and a tank 17 having a major diameter of about 28" to provide a substantially compact filter cone structure, eighteen (18) of the tubes comprising a 10° offset. Tanks 15, 17 each comprise an array of piercings/communication ports to receive a respective number of finned tubes for heat dissipation. Although a one-row array of finned tubes is shown, it is contemplated that a tube array could accommodate several rows of tubes radiating from tank 15 toward tank 17.

To be able to transfer heat well, the tube material should have good thermal conductivity. One having ordinary skill in the art of heat exchanger design/manufacturing will recognize the suitable fin design which is necessary to achieve the goal for which the disclosed device is implemented. For example, a suitable goal may be to accommodate an apparatus designed to 150% of a maximum OEM fuel pressure specification. In addition, one having skill in the heat exchanger art would understand that modifications of the apparatus and methods disclosed herein for the purpose of scaling up or down could be achieved and still fall within the scope of the disclosure.

Figure 5:
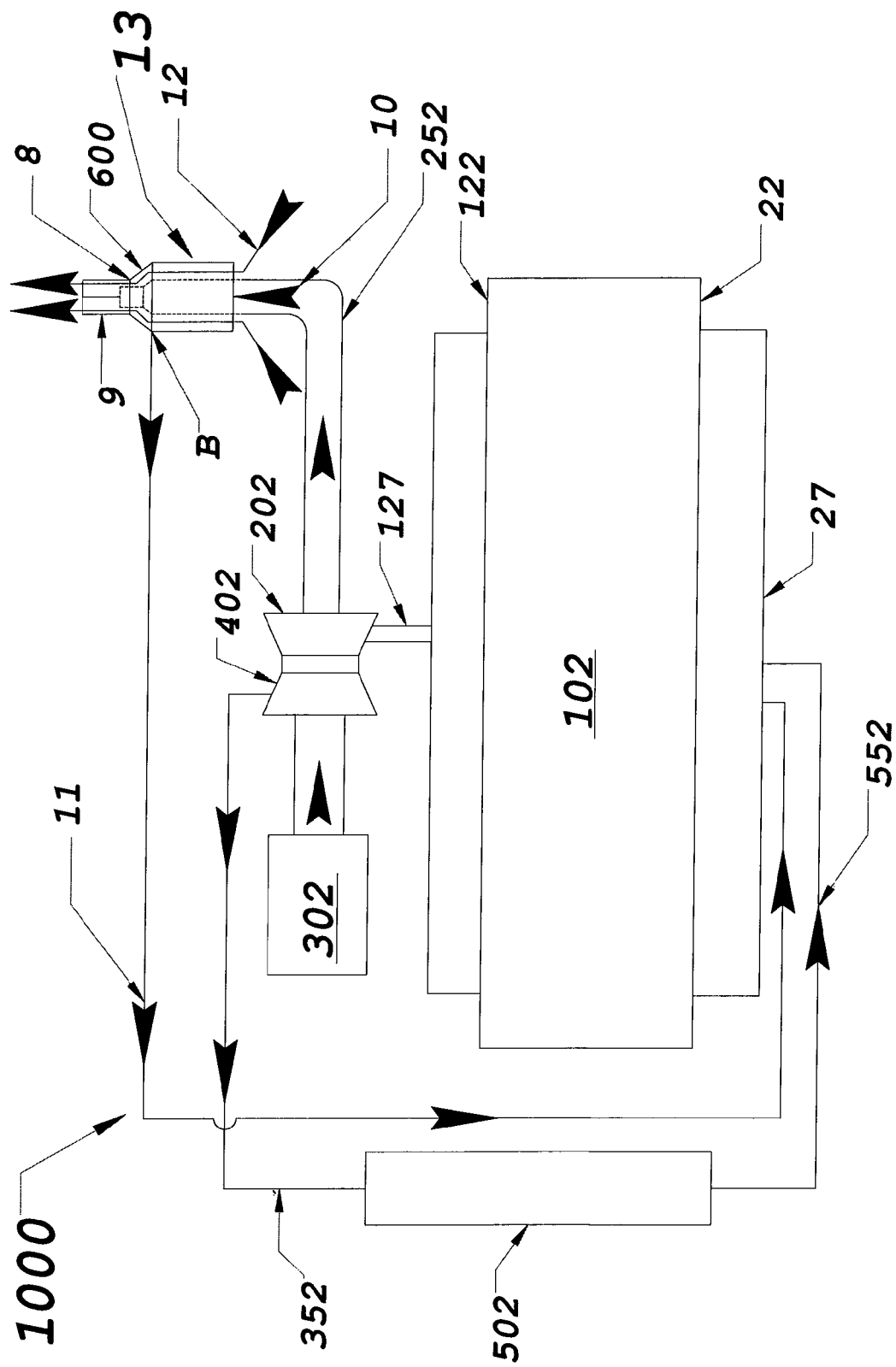
FIG. 5 is a schematic of a system employing one embodiment of the apparatus disclosed herein.

FIG. 5 is a schematic of one embodiment of a system incorporating the disclosed device. System 1000 comprises engine 102 which has an inlet side 22 and an exhaust side 122. An exhaust line 127 conveys engine exhaust from exhaust 122 to turbine 202. Exhaust line 252 conveys exhaust 10 from turbine 202 to heat exchanger 13. Heat exchanger 13 comprises a conically shaped heat exchanger housing 600 disposed circumferentially about and spaced away from an outer diameter of exhaust conduit 252. Ambient air 12 is drawn into an array of inlet holes 640 (see FIGS. 2, 3) located in base plate 620 of heat exchanger 13. Conduit 11 communicates cooled EGR from outlet B to engine intake manifold 27. With the disclosed device, conduit 11 is the only conduit used in system 1000.

An upper outer diameter of heat exchanger housing 600 comprises a funnel-shaped end housing 9 having an outer diameter that is substantially the same as that of exhaust conduit 252. End housing 9 is mounted over a reduced section of pipe 252, thereby resulting in gap 660 between the pipe sections (see also FIG. 3). End housing 9 of heat exchanger 13 enables a portion of exhaust 10 to be exhausted to atmosphere along with a portion of the cooling medium which diffuses into exhaust stream 10 via gap 660. Concentric venturi 8, which is produced by reducing at least one diameter of exhaust line 252, is housed in the boundary of heat exchanger housing 600. Concentric venturi 8 is created by reducing the area of the exhaust pipe to a dimension of approximately sixty percent of its original size and extending at least a length equal to the original pipe diameter. In cases where a section of exhaust conduit 252 comprises a reverse taper, the reduction in the conduit can provide for a greater venturi effect. Heat exchanger 13 further comprises an outer skin 21 (see FIG. 3) which provides a seal for end housing 9 and housing 600.

Air filter 302 receives air from the environment which is conveyed to compressor 402. Air intake line 352 conveys compressed air to an inlet of charge air cooler 502. Intake line 552 conveys cooled charge air 552 from charge air cooler 502 to engine intake manifold 27.

The disclosed device provides for the manufacture of a conically-shaped radiator/heat exchanger that draws cooling medium 12 across its cooling fins 16 by means of venturi 8 in the exhaust pipe 252. The conically-shaped radiator is disposed circumferentially about and spaced away from an outer diameter of the exhaust pipe. The system comprises at least one tank 15 for the medium to be cooled and at least one outlet tank 17 whereby the cooled EGR gases exit by means of outlet B. In an alternate embodiment comprising a clamshell heat exchanger housing, two semi-circular tanks 15*a*, 15*a*, and 17*a*, 17*b* (not shown) could be employed. Each tank could have an array of piercings/communication ports to receive a respective number of finned tubes for heat dissipation.

It is contemplated that the components of the disclosed device may be constructed from mild steel, stainless steel, etc. For example, mild steel may be implemented for various of the disclosed applications to address vibration issues and to provide a suitable thermal conductivity (approximately 36 W/(m K) at 20° C.). In addition, mild steel could be chosen so it may be used with a solder (e.g., silver, etc.) which is capable of withstanding the temperature of the exhaust.

As described herein, the disclosed device provides for a heat exchanger that is mounted in-line with an exhaust venturi. It is also contemplated that two or more heat exchangers could be placed in series one with another to thereby provide a double- or multiple-barrel embodiment.

When an engine is working the hardest, it creates a large amount heat as well as a increased amount of exhaust. The disclosed device provides for a high performance cooling system that addresses situations where there is a large volume of medium to be cooled over the heat exchanger cooling fins as in the case of large stationary engines (i.e., devices capable of moving approximately 13,000 CFM of exhaust flow) and specifically in the case of nonroad engines which do not use ram-air for cooling purposes like a typical road-based motor vehicle. Since the conveyance of the cooling medium and the medium to be cooled is an integral part of the design of the heat exchanger, the disclosed device reduces the number of connection points and conduits needed for the operation thereof.

The disclosed device has been described in relation to nonroad diesel engine applications, however, there are other useful applications. For example, the disclosed device could be used in the cooling of transmission fluid, cooling of the charge air that enters an intake manifold of an engine, cooling of engine coolant, cooling of lubricating oils, etc. These are just some of the many applications in which a fluid cooling system which employs a heat exchanger having an in-line venturi in the exhaust line for creating a pressure differential between and an inlet area and a cooling area can be implemented. It will be apparent to one of ordinary skill in the art from this disclosure that appropriate engineering will likely be necessary to achieve the goal for which the disclosed device are to be employed. In addition, it will be apparent to one having ordinary skill in the art that in addition to the size, quantity and configuration of the finned tubes, the pipe size, the size and quantity of the cooling chambers, the size and location of the venturis, the location and quantity of outlet and inlet ports of the fluid cooling system, the nature and type of fluid being cooled, any cooling medium to be employed, etc. will depend on the particular application of the system.

The disclosed system can be used in conjunction with an exhaust gas recirculation (EGR) system comprising an engine capable of generating a heated exhaust and an exhaust line to carry the heated exhaust. The disclosed a heat exchanger system comprises: a heat exchanger mounted in-line with the exhaust line, the heat exchanger is disposed circumferentially about and spaced away from an outer diameter of the exhaust line. The heat exchanger further comprises a tank to receive a diverted portion of the heated exhaust, the tank being in communication with an outlet tank by means of one or more cooling tubes. The outlet tank is capable of receiving cooled exhaust. The heat exchanger further comprises a venturi configured in the exhaust line to drive the cooling medium therethrough so it may pass over one or more cooling tubes to cool the diverted portion of heated exhaust therein. A conduit conveys cooled exhaust from the outlet tank to an intake of the engine whereby EGR can be recirculated.

The disclosed heat exchanger further comprises an inlet capable of inducing a pressure differential to draw a cooling medium therein. The inlet venturi further comprises one or more holes disposed in a base plate mounted perpendicular to the exhaust line. In addition, the exhaust line further comprises an inlet to convey heated exhaust to the tank. A portion of the diverted exhaust can be discharged to atmosphere along with a portion of the cooling medium. With the disclosed heat exchanger, the tank, the outlet tank and the one or more cooling tubes forms a cage structure. The cage structure further comprises a cone or a cylinder.

In one embodiment, a heat exchanger assembly comprises: a first tank having a volume for receiving a portion of a heated exhaust diverted from an exhaust pipe; a second tank having a volume for receiving a cooled exhaust; one or more cooling tubes in communication with the first tank and the second tank, the one or more cooling tubes capable of providing a heat transfer interface whereby heated exhaust can be cooled. The first tank, the second tank and the one or more cooling tubes form a cage structure capable of being disposed circumferentially about and spaced away from an outer diameter of an exhaust pipe. The disclosed cage structure resides in a housing to form a housed heat exchanger capable of being mounted in-line with an exhaust line of an EGR system. As stated above, the cage structure further comprises a cone or a cylinder. A conduit conveys cooled exhaust from the second tank to an intake of an engine. The housed heat exchanger further comprises an insulative skin.

The disclosed method comprises the steps of: mounting a heat exchanger in-line with an exhaust line, the heat exchanger being disposed circumferentially about and spaced away from an outer diameter of the exhaust line; diverting a portion of heated exhaust from the exhaust line through an inlet, whereby heated exhaust is conveyed to the tank; cooling the heat exhaust by means of the cooling tubes, whereby cooled exhaust is conveyed to the outlet tank; and recirculating cooled exhaust from the outlet tank to an intake of the engine by means of a conduit. The heat exchanger further comprises a tank to receive a diverted portion of heated exhaust from said exhaust line. The tank is in communication with an outlet tank by means of one or more cooling tubes. The outlet tank is capable of receiving cooled exhaust. The heat exchanger further comprises a venturi configured in the exhaust line to drive the cooling medium therethrough so it may pass over said the or more cooling tubes to cool the diverted portion of heated exhaust therein. The method further comprises the step of drawing a cooling medium through an inlet venturi comprising one or more holes disposed in a base plate mounted perpendicular to said exhaust line. In addition, the method comprises the step of discharging a portion of the diverted exhaust to atmosphere along with a portion of the cooling medium.

The disclosed apparatus comprises: a first tank having a volume for receiving a heated medium; one or more cooling tubes in communication with the first tank and a second tank, the one or more cooling tubes capable of providing a heat transfer interface whereby a heated medium can be cooled; the second tank having a volume for receiving a portion of a cooled medium; and wherein the first tank, the second tank and the one or more cooling tubes form a cage structure capable of being disposed circumferentially about and spaced away from an outer diameter of a pipe capable of carrying said heated medium.

Although the disclosed device and method have been described with reference to disclosed embodiments, numerous modifications and variations can be made and still the result will come within the scope of the disclosure. No limitation with respect to the specific embodiments disclosed herein is intended or should be inferred.

I claim:

1. In conjunction with an exhaust gas recirculation (EGR) system comprising an engine capable of generating a heated exhaust and an exhaust line to carry said heated exhaust, a heat exchanger system comprising:
a heat exchanger mounted in-line with said exhaust line, said heat exchanger being disposed circumferentially about and spaced away from an outer diameter of said exhaust line;
said heat exchanger further comprising an inlet tank disposed circumferentially about said exhaust line to receive a diverted portion of said heated exhaust, said inlet tank being in communication with an outlet tank disposed circumferentially about said exhaust line by means of one or more cooling tubes, said outlet tank capable of receiving cooled exhaust;
said heat exchanger further comprising a venturi configured about said exhaust line to drive a cooling medium therethrough so it may pass over said one or more cooling tubes to cool said diverted portion of heated exhaust therein; and a conduit to convey cooled exhaust from said outlet tank to an intake of said engine whereby EGR can be recirculated.

2. The system of claim 1, wherein said heat exchanger further comprises an inlet capable of inducing a pressure differential to draw a cooling medium therein.

3. The system of claim 2, wherein said inlet further comprises one or more holes disposed in a base plate mounted perpendicular to said exhaust line.

4. The system of claim 1, wherein said exhaust line further comprises an inlet to convey heated exhaust to said tank.

5. The system of claim 1, wherein a portion of said diverted exhaust can be discharged to atmosphere along with a portion of said cooling medium.

6. The system of claim 1, wherein said tank, said outlet tank and said one or more cooling tubes forms a cage structure.

7. The system of claim 6, wherein said cage structure further comprises a cone.

8. The assembly of claim 6, wherein said cage structure further comprises a cylinder.

9. A heat exchanger assembly comprising:
a first tank disposed circumferentially about an exhaust pipe having a volume for receiving a portion of a heated exhaust diverted from said exhaust pipe;
a second tank disposed circumferentially about said exhaust pipe having a volume for receiving a cooled exhaust;
one or more cooling tubes in communication with said first tank and said second tank, said one or more cooling tubes capable of providing a heat transfer interface whereby heated exhaust can be cooled; and
wherein said first tank, said second tank and said one or more cooling tubes form a cage structure capable of being disposed circumferentially about and spaced away from an outer diameter of an exhaust pipe.

10. The assembly of claim 9, wherein said cage structure resides in a housing to form a housed heat exchanger capable of being mounted in-line with an exhaust line of an exhaust gas recirculation (EGR) system.

11. The assembly of claim 9, wherein said cage structure further comprises a cone.

12. The assembly of claim 9, wherein said cage structure further comprises a cylinder.

13. The assembly of claim 9 further comprising a conduit to convey cooled exhaust from said second tank to an intake of an engine.

14. The assembly of claim 10, wherein said housed heat exchanger further comprises an insulative skin.

15. A method comprising the steps of:
mounting a heat exchanger in-line with an exhaust line, said heat exchanger being disposed circumferentially about and spaced away from an outer diameter of said exhaust line;
said heat exchanger further comprising an inlet tank disposed circumferentially about said exhaust line to receive a diverted portion of heated exhaust from said exhaust line, said inlet tank being in communication with an outlet tank disposed circumferentially about said exhaust line by means of one or more cooling tubes, said outlet tank capable of receiving cooled exhaust;
said heat exchanger further comprising a venturi configured in said exhaust line to drive said cooling medium therethrough so it may pass over said one or more cooling tubes to cool said diverted portion of heated exhaust therein;

diverting a portion of heated exhaust from said exhaust line through an inlet, whereby heated exhaust is conveyed to said tank;

cooling said heat exhaust by means of said cooling tubes, whereby cooled exhaust is conveyed to said outlet tank; and recirculating cooled exhaust from said outlet tank to an intake of said engine by means of a conduit.

16. The method of claim 15, further comprising the step of drawing a cooling medium through an inlet venturi comprising one or more holes disposed in a base plate mounted perpendicular to said exhaust line.

17. The method of claim 15, further comprising the step of discharging a portion of said diverted exhaust to atmosphere along with a portion of said cooling medium.

18. A heat exchanger assembly comprising:

a first tank disposed circumferentially about an exhaust line having a volume for receiving a heated medium;

one or more cooling tubes in communication with said first tank and a second tank disposed circumferentially about said exhaust line, said one or more cooling tubes capable of providing a heat transfer interface whereby a heated medium can be cooled;

said second tank having a volume for receiving a portion of a cooled medium; and wherein said first tank, said second tank and said one or more cooling tubes form a cage structure capable of being disposed circumferentially about and spaced away from an outer diameter of a pipe capable of carrying said heated medium.

* * * * *